United States Patent
McClure

[11] 3,757,909
[45] Sept. 11, 1973

[54] FLUID DYNAMOMETER HAVING A ROTATING STATOR HOUSING

[75] Inventor: John W. McClure, Charleston, S.C.

[73] Assignee: Avco Corporation, Charlestown, S.C.

[22] Filed: July 23, 1971

[21] Appl. No.: 165,623

[52] U.S. Cl. .................................. 188/290, 73/134
[51] Int. Cl. ............................................. F16d 57/02
[58] Field of Search ........................... 188/290, 296; 192/3 R; 415/78; 60/54; 73/134

[56] References Cited
UNITED STATES PATENTS
2,715,688  8/1955  Hacker ............................. 73/134 X
1,718,175  6/1929  Nilson ................................ 188/290
2,670,815  3/1954  Wilson ............................... 188/290

FOREIGN PATENTS OR APPLICATIONS
466,436  5/1937  Great Britain ...................... 188/296

Primary Examiner—George E. A. Halvosa
Attorney—Charles M. Hogan and Irwin P. Garfinkle

[57] ABSTRACT

A dynamometer such as a water brake is provided with a rotatable housing so that the normal stator disks are rotatable. In one embodiment the housing with the attached stator disks are counterrotated. In another embodiment the stator housing is free to rotate in a forward or a reverse direction or may be maintained stationary.

2 Claims, 2 Drawing Figures

INVENTOR.
JOHN W. McCLURE
BY Charles M. Hogan
Irwin P. Garfinkle
ATTORNEYS.

FLUID DYNAMOMETER HAVING A ROTATING STATOR HOUSING

BACKGROUND OF THE INVENTION

The present invention is particularly concerned with a water dynamometer, sometimes also referred to as a water brake. Typical of prior art water dynamometers are the devices described in Sheldon U.S. Pat. No. 3,091,309, Bennett U.S. Pat. No. 2,189,189, and Nilson U.S. Pat. No. 1,718,175. In general, every prior art water dynamometer comprises a housing with a plurality of stator disks affixed thereto and a shaft carrying a plurality of rotor disks interleaved between the stator disks, restricted fluid passages being provided between the stator and rotor disks. When the shaft is driven by a device under test, then upon the introduction of a fluid, such as water, into the housing, the liquid absorbs energy, and hence the rotor presents a torque to the device under test. The amount of energy that can be absorbed is dependent on a multiplicity of factors, i.e., momentum exchange of the working fluid, viscous shear, the size of the unit, its internal construction, and the amount of liquid passing between the stator and the rotor.

Cavitation is a major water brake problem which causes an adverse effect on dynamometer life. In general, cavitation damage tends to localize and very often manifests itself on the nonrotating stator elements. To minimize damage due to cavitation it has been necessary to limit rotor tip speed which is a function of input shaft speed and rotor diameter. The net result is a maximum relative velocity between the rotor disks and stator disks, and this maximum limits the power that can be absorbed in a water brake.

THE IMPROVEMENT

I have found that the relative velocity between the rotor and the stator and hence the power absorption of the water brake can be increased and controlled by permitting rotation of the stator disks. In one embodiment I increase the power absorption capabilities of a water brake by counterrotating the stators by means of a set of gears coupling the rotors and the stators. In another embodiment I provide a free stator, i.e., one which is free to rotate in either direction or remain stationary.

By counterrotating the stator with respect to the rotor there is an increase in relative velocity which yields a higher power absorption for the same input shaft speed and disk diameters as would result from a water brake having a fixed stator design. The resultant increase in power is realized because the damage due to any cavitation that may occur is more evenly distributed, thereby yielding a prolonged life for the water brake. With the dynamometer free to rotate in either direction, a wide degree of control in the power absorption levels may be achieved.

OBJECTS OF THE INVENTION

It is an object of this invention to provide a fluid dynamometer in which the normally fixed stator disks are rotatable.

It is another object of this invention to provide a fluid dynamometer in which the normally fixed stator disks are counterrotatable with respect to the rotor disks so that the relative velocity between the disks is increased, thereby increasing the power absorption capabilities of the dynamometer.

Still another object of this invention is to more evenly distribute the damage of water dynamometers due to cavitation by rotating the stator disks.

THE DRAWINGS

FIG. 1 diagrammatically represents a fluid dynamometer having a free stator;

FIG. 2 is a schematic representation of a fluid dynamometer having stator disks which counterrotate with respect to the rotor disks.

DESCRIPTION OF THE FIG. 1 EMBODIMENT

The fluid dynamometer shown in FIG. 1 consists primarily of two major assemblies. One is the assembly which includes a shaft 10 coupled to a prime mover (not shown) and rotor disks 12 affixed to the shaft 10. The second assembly includes the housing 14 to which are affixed a plurality of disks 16, which in a conventional fluid dynamometer would be referred to as stator disks. For the purpose of this disclosure the disks 16 will be referred to as stator disks.

The rotor disks 12 and the stator disks 16 are similar to those used in conventional water brakes, each being provided with a plurality of holes 17 which provide restricted fluid passageways. The stator and rotor disks are conventionally interleaved so that they present axially spaced opposed faces. End plates 18 and 20 are the grounded elements providing the fixed support for both rotatable assemblies.

The shaft 10 is supported in the end plates 18 and 20 by means of bearings 22. The housing 14 is rotatably supported in the end plates 18 and 20 by means of bearings 24. The end plates 20 also provide fluid inlets 26 and 28 through which water or other fluid may be admitted, while end plate 18 provides fluid outlets 30 and 32 through which the fluid is exhausted.

For the purpose of controlling the rotation of the housing 14 and the affixed stator disks 16, I provide a ring turbine 34 against which I direct a fluid jet from a nozzle 36 also supported in the fixed end plate 20. The fluid to the nozzle is supplied from a source (not shown) through a fluid inlet 38 and is controlled by means of a valve 40.

The ring turbine 34 in conjunction with the nozzle 36 provide a fluid coupling that controls the direction and speed of the rotation of the free stator disks 16. The fluid jet, under controlled pressure and velocity emitted from the nozzle 36, strikes the ring turbine 34 producing a turning force or torque in opposition to the force exerted by the fluid drag generated by the rotating rotor assembly. The difference in the two opposing forces acting on the free stator disks determines the speed and direction of the free stator assembly. Thus, if the jet supply is turned off at the control valve, the free stators will rotate in the same direction as the rotor disks and little power will be absorbed by the water brake. On the other hand, if the jet from the nozzle 36 is such as to just equalize the drag due to viscous shear, etc., then the housing remains stationary and the dynamometer operates in a conventional manner. If the power or jet from the nozzle 36 is increased to cause the stator disks to counterrotate, then the power absorption capability of the device is increased beyond that normally expected of a water brake of the same size.

In summary, the direction and relative speed of the stator disks with respect to the rotor disks are directly proportional to the difference between the viscous drag forces of the rotor assembly and the force exerted on the ring turbine by the fluid control nozzle. When these two forces are equal, no rotation of the stator assembly is realized. Counterrotation of the stator assembly is achieved when the fluid forces of the nozzle acting on the ring turbine exceed the drag forces. Rotation of the stator disks in the same direction as the rotor disks results when the fluid forces of the nozzle acting on the ring turbine are less than the drag forces.

DESCRIPTION OF THE EMBODIMENT OF FIG. 2

Figure 1:
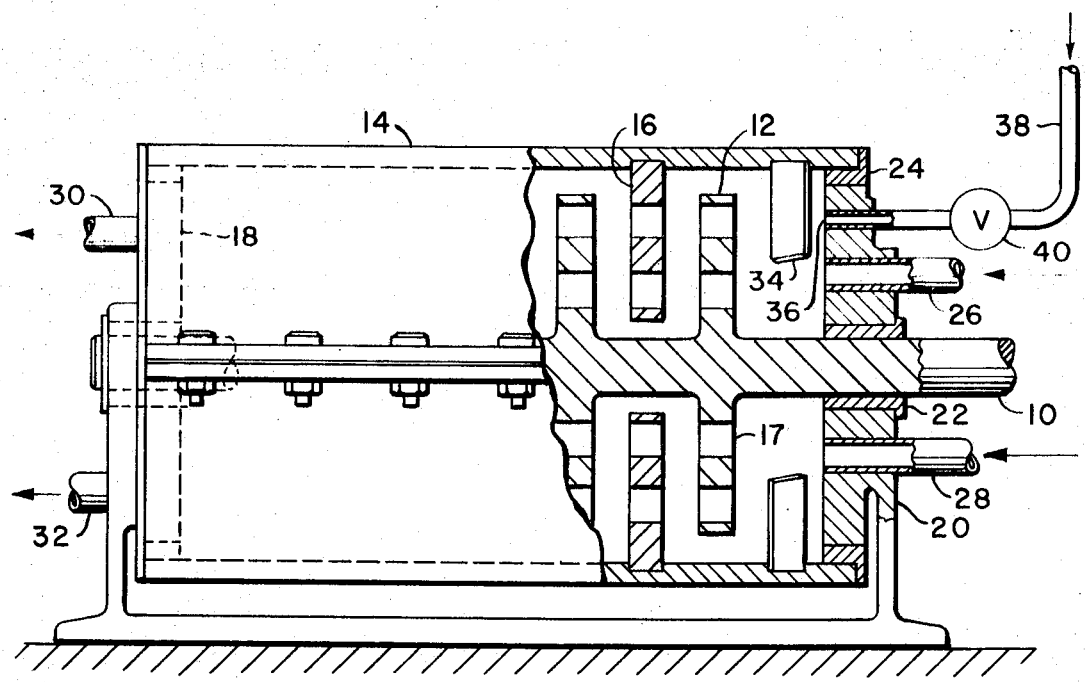
Figure 2:
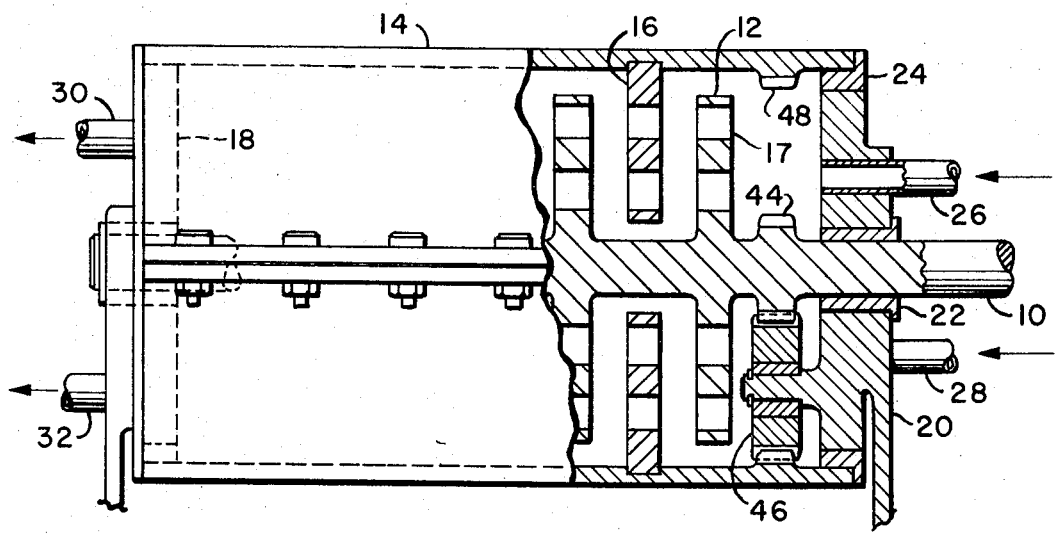

The embodiment shown in FIG. 2 is very similar to that shown in FIG. 1 and the same reference characters designate the same parts. The main difference is that the ring turbine 34 is omitted and instead the stator disks are rotated by means of a planetary gear set consisting of a sun gear 44 affixed to the shaft 10, a plurality of planet gears 46 (only one is shown) supported from the end plate 18, and a ring gear 48 affixed to the housing 14. Rotation of the input shaft 10 results in counterrotation of the stator disks 16 with respect to the rotor disks 12.

The embodiment of FIG. 2 has the advantage of simplicity over the embodiment of FIG. 1, but obviously it cannot provide the same degree of modulation as the FIG. 1 device.

SUMMARY OF THE INVENTION

Both disclosed embodiments of this invention provide for counterrotation of the stator disks relative to the rotor disks and this results in higher power absorption per stage and in greater overall resistivity to cavitation. In addition, the "free" stator concept disclosed in FIG. 1 provides improved modulation; i.e., control of power absorption levels from very low power to very high power.

I claim:
1. A dynamometer comprising:
   a non-rotatable support;
   a housing rotatably mounted from said support, said housing being rotatable on an axis;
   a plurality of axially spaced stator disks affixed to the inner periphery of said housing, each of said disks having an aperture on said axis;
   a rotatably driven shaft within said housing, said shaft being rotatably mounted from said support and extending through said apertures;
   rotor disks affixed to said shaft, said rotor disks being interleaved with said stator disks to present axially spaced opposed faces;
   non-rotating fluid inlet and fluid outlet means extending through said support and into said housing for admitting fluid to said housing; and
   fluid coupling means for rotating said housing and said stator disks on said axis comprising a rotatable turbine fixedly mounted on the inner periphery of said housing, and a jet stream directed against said turbine and said housing for driving said turbine in a direction counter to the direction of rotation of said shaft.

2. The invention as defined in claim 1 wherein said jet rotates said turbine and said housing in opposition to the fluid forces generated by said fluids admitted to said housing, the direction of rotation of said turbine and said housing being determined by the relative effect of said fluid forces and said turbine.

* * * * *